(No Model.) 4 Sheets—Sheet 1.
W. H. STAATS.
MONEY CHANGER.
No. 364,141. Patented May 31, 1887.
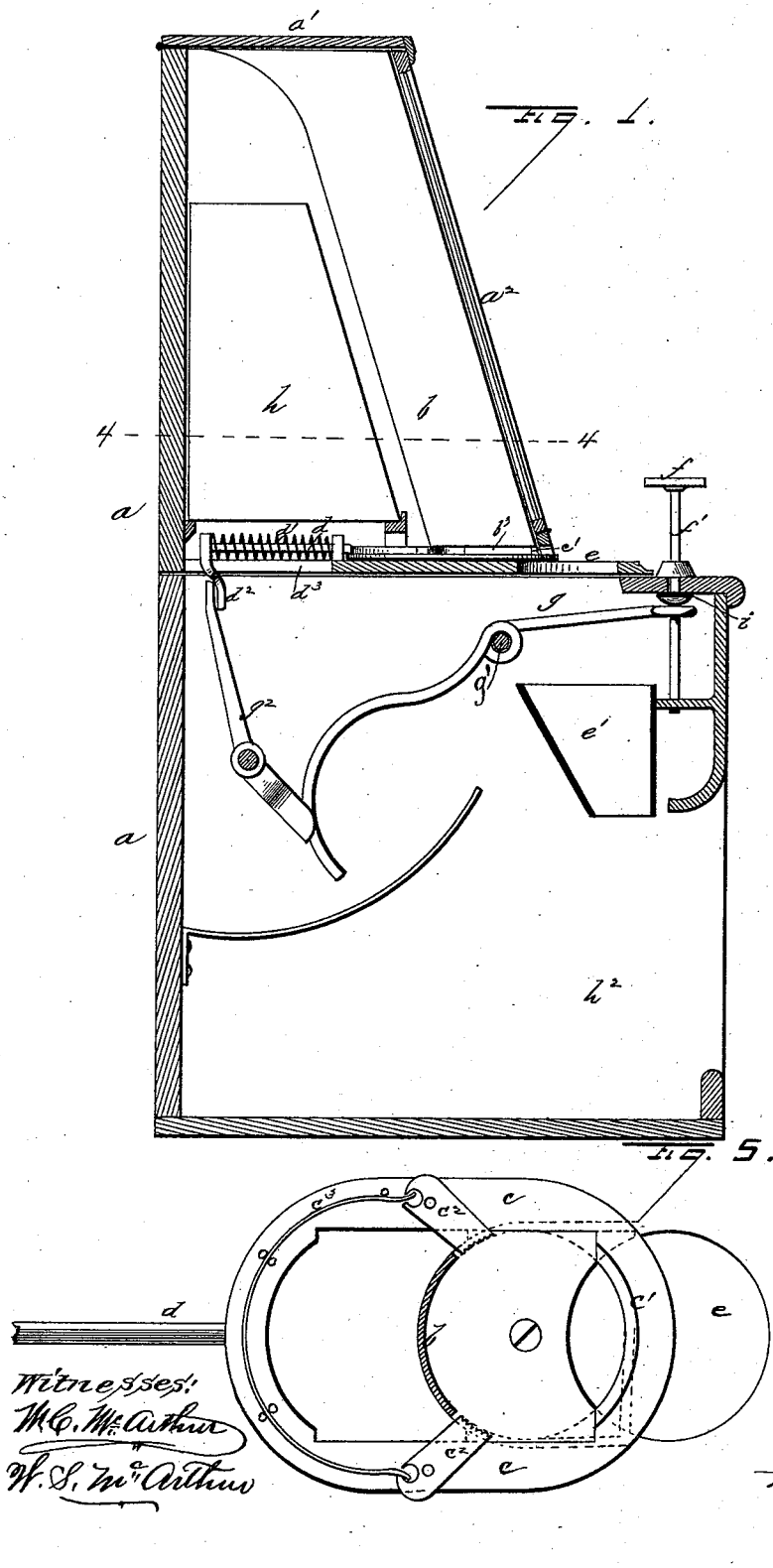

(No Model.)  4 Sheets—Sheet 2.
W. H. STAATS.
MONEY CHANGER.
No. 364,141. Patented May 31, 1887.
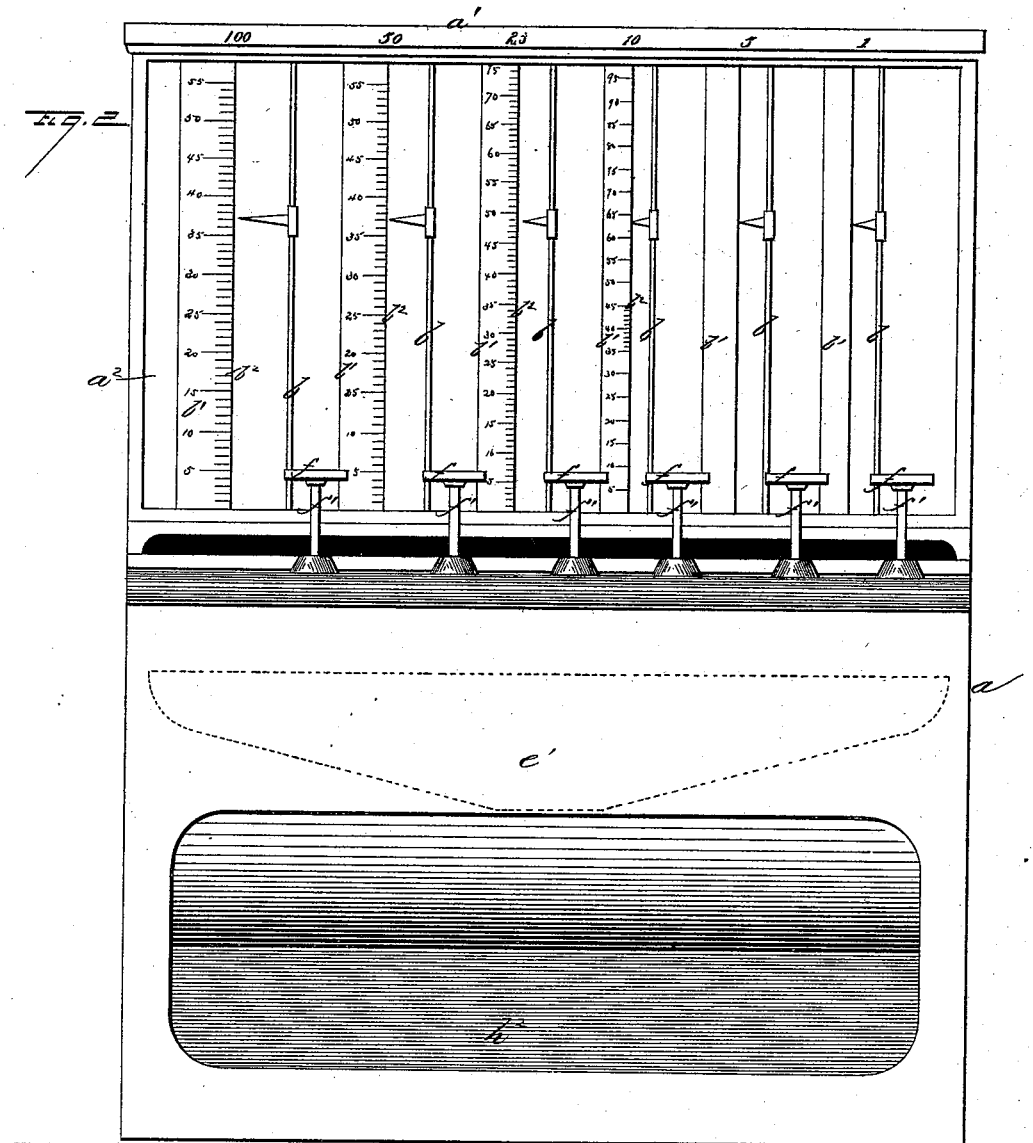
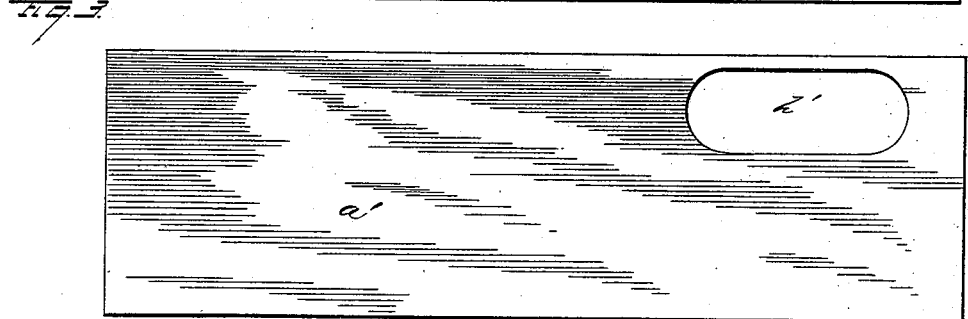
Witnesses:
Inventor
William H. Staats
per
H. Harrison
Attorney.

(No Model.) 4 Sheets—Sheet 3.

W. H. STAATS.
MONEY CHANGER.

No. 364,141. Patented May 31, 1887.

Witnesses:
H. C. McArthur
H. S. McArthur

Inventor:
William H. Staats
per
H. Harrison
Attorney.

(No Model.)  4 Sheets—Sheet 4.
W. H. STAATS.
MONEY CHANGER.
No. 364,141.  Patented May 31, 1887.
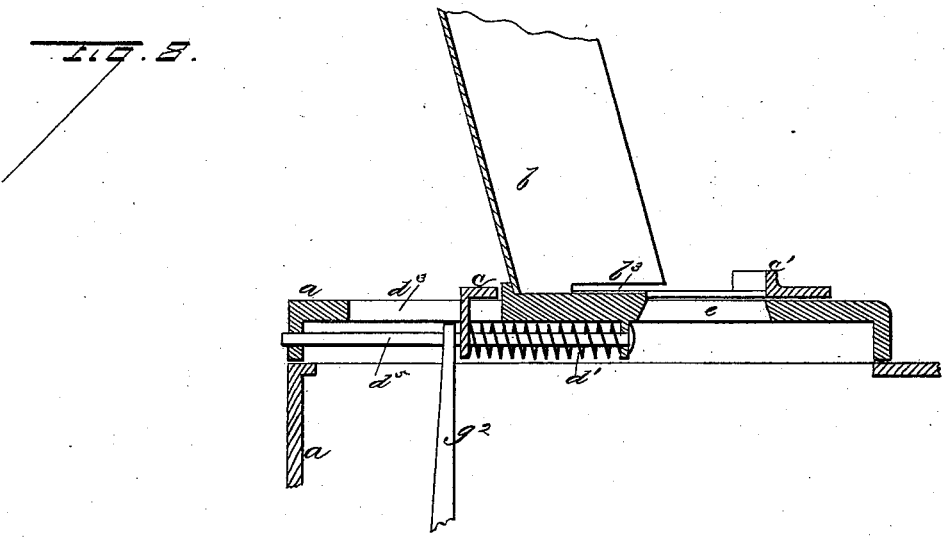
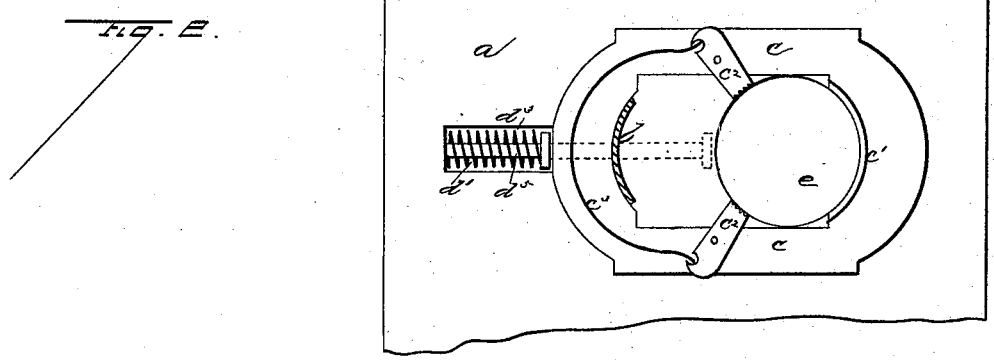
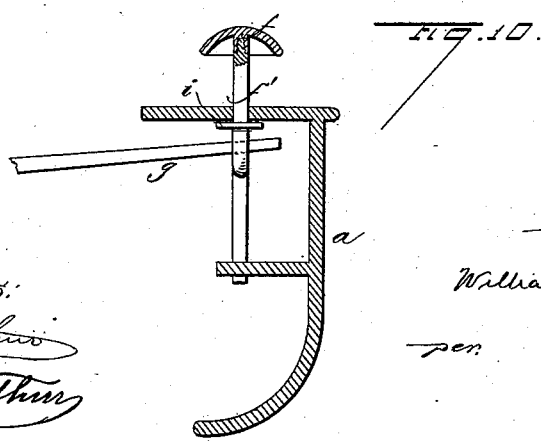
Witnesses:
H. C. McArthur
W. S. McArthur
Inventor:
William H. Staats
per
H. Harrison
Attorney.
N. PETERS, Photo-Lithographer, Washington, D. C.

UNITED STATES PATENT OFFICE.

WILLIAM H. STAATS, OF CHICAGO, ILLINOIS, ASSIGNOR OF ONE-HALF TO JAMES F. GRIFFIN, OF SAME PLACE.

MONEY-CHANGER.

SPECIFICATION forming part of Letters Patent No. 364,141, dated May 31, 1887.

Application filed May 8, 1886. Serial No. 201,512. (No model.)

*To all whom it may concern:*

Be it known that I, WILLIAM H. STAATS, a citizen of the United States, residing at Chicago, in the county of Cook and State of Illinois, have invented certain new and useful Improvements in Money-Changers, of which the following is a specification, to wit:

This invention relates to an improvement in money-changing machines; and it consists in certain peculiarities of the construction and arrangement of the same, substantially as will be hereinafter more fully set forth and claimed.

In order to enable others skilled in the art to which my invention pertains to make and use the same, I will now proceed to describe its construction and operation, referring to the accompanying drawings, in which—

Figure 4:
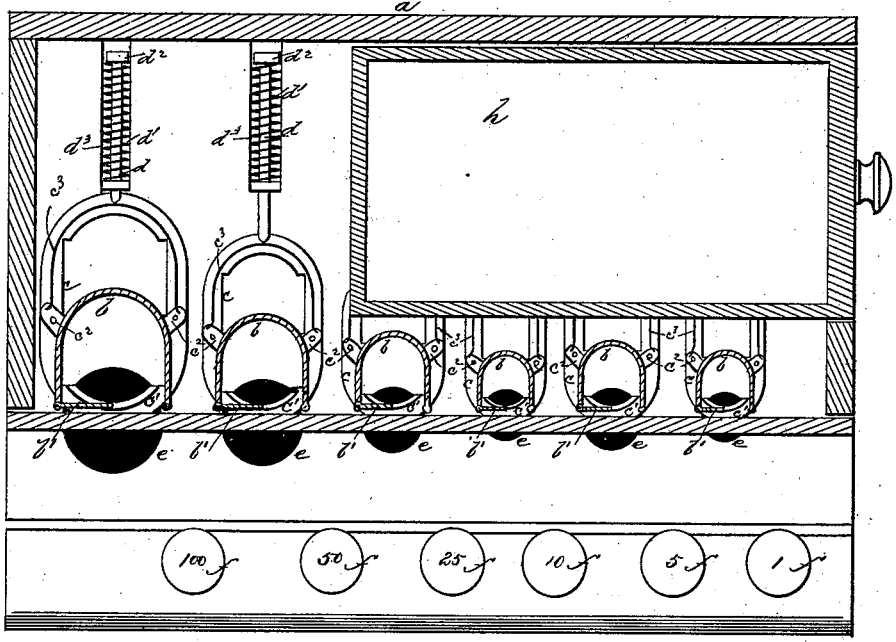
Figure 6:
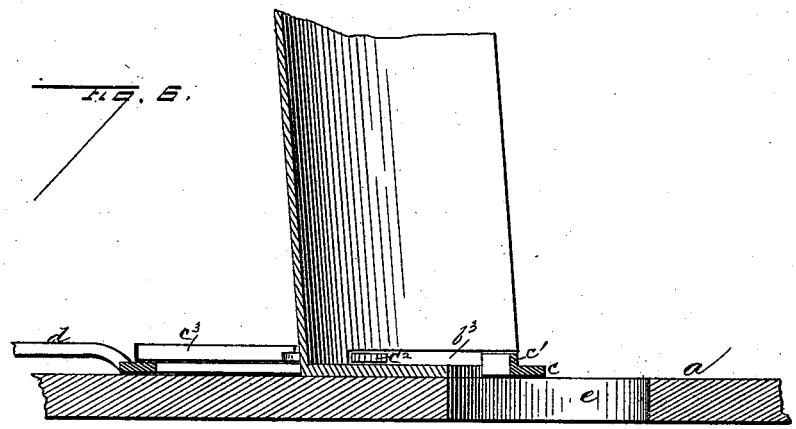
Figure 7:
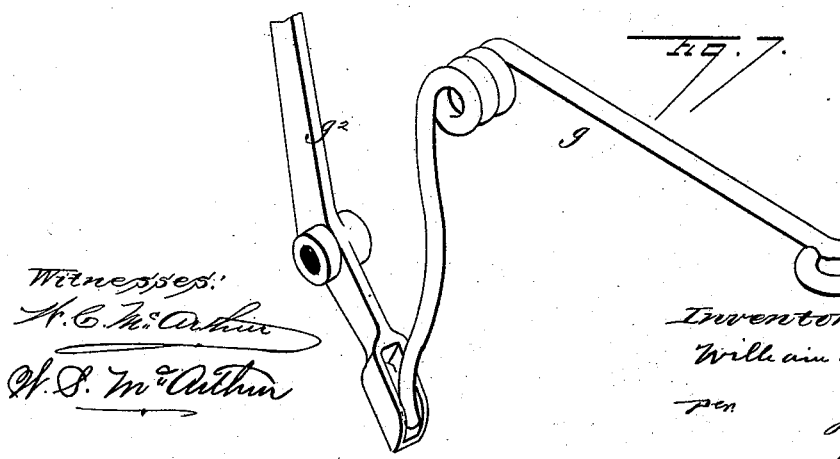

Figure 1 is a vertical transverse section of my device. Fig. 2 is a front elevation of the same. Fig. 3 is a view of the hinged cover; Fig. 4, a horizontal section taken through line 4 4 of Fig. 1, showing the lower ends of the coin-holders. Fig. 5 is an enlarged plan view of the feeding-slide; Fig. 6, a vertical section of the same, and Fig. 7 is a detail view of the operating-levers. Figs. 8, 9, and 10 are modifications of the details of construction.

$a$ represents the case of my device, which is made in two parts, resting one upon the other, and may be readily separated, as shown in the drawings. The upper part of this case is provided with a hinged top or cover, $a'$, and a hinged glass front, $a^2$, which may be readily opened, and which allows the coin-holders to be freely seen at all times.

Within this upper case is arranged a series of coin-holders, $b$, preferably slightly inclined, as illustrated, and having their fronts partially closed by doors $b'$, which do not quite close the tubes, leaving a space through which the contents are seen, and these doors are swung open at any time to permit the coins to be placed in the holders. These doors are preferably provided with a series of graduations, as at $b^2$, corresponding to the thickness of the coins inclosed, and the opposite edge of the holder is provided with a sliding pointer, to be set at any desired point to show the amount of coin first placed in the holder.

The series of holders are of course of any required number and of graduated size, according to the denomination of the coin intended to be held therein, and each is cut away at the lower end upon its sides, as at $b^3$, this cut or slot being just sufficient to permit the passage edgewise of the lower one of the coins contained in each holder. The doors are similarly cut away to allow the coins to pass beneath them.

In the rear of these coin-holders are a series of ejector-slides, $c$, which are clearly shown in Fig. 5, having upwardly-projecting flanges $c'$, which operate in connection with a number of spring-pushers, $c^2$, which are serrated at their free ends, their other ends being pivoted to the bottom or frame of the holders. The free ends of these pushers work in slots cut in the sides of the lower ends of the tubes, and serve to push the lower coins out through the slotted holders or tubes $b$, where they drop through the discharge-opening and through the guide-funnel into the hand to receive them.

The rear end of each slide is provided with a stem, $d$, running through suitable guides on the case, and provided with a recoil-spring, $d'$. On the end of this stem is a finger or arm, $d^2$, which projects downward through a slot, $d^3$, in the bottom of the upper case, and is there engaged by the actuating-levers, as presently explained.

Through the bottom of the upper case, in front of the coin-holders and in alignment therewith, is formed a series of holes, $e$, for the discharge of the coins, and below this series of discharge-openings, in the lower case, is placed a funnel, $e'$, having a single discharge-opening in its bottom, to which the coins from all the holders are directed. In front of these openings $e$ is a series of keys, $f$, each supported upon a stem, $f'$, sliding vertically in the lower casing, and levers $g$, pivoted on a suitable rod, $g'$, passing through the case, are connected to each key-stem at their forward ends, and their rear ends rest against a second series of levers, $g^2$, also fulcrumed on a rod in the casing, and having their ends in contact with the fingers on the stems of the ejector-slides.

In operation the glass front is turned back and the coins placed in the holders, the pointers thereon being set to show the number so placed therein. When any desired amount of change is wanted, one or more of the keys are depressed, and the levers at once force forward the slides corresponding therewith. The pushers upon these slides, lying behind the lower coin in the pile, push it out through the slotted holder, and it then drops through its discharge-opening, and thence through the guide-funnel into the hand which is held under it. As soon as the key is released, the spring on the slide at once draws it back, and it will be observed that the pushers slide easily under the edge of the coins on the backward stroke, and therefore do not deface the coin, while the slide itself does not come in contact with the coin, and it is therefore possible to use a much lighter spring. It will be noticed that the coin is held before ejectment between the spring-pushers and the flange on the slide, and should one of the keys be partially depressed by accident the coin is drawn back again by the flanged slide, and cannot get twisted and jammed in the holder.

It is evident that the operating-levers may be jointed together in any suitable way, and that the case may be made in one piece; but I have preferred to form the latter in two parts, as shown, in order that the upper part, containing the money, may be readily removed at night and placed in a safe or vault and replaced in the morning. The amount of coin on hand can be at any time seen, as the graduated scale shows at once the amount in the holders and the pointers the amount first placed therein.

For convenience in use, I have provided the case $a$ with a drawer, $h$, in its upper part, in rear of the holders, to contain the coin taken in during business hours, which is placed therein through an opening, $h'$, in the top, and a space, $h^2$, is provided in the bottom of the case for containing bills.

To render the action as noiseless as possible, I have provided rubber washers $i$ on the key-stems, and the levers $g$ are formed of stiff spring-wire, thus taking off all the shock.

In Figs. 8 and 9 I have represented a modification of the construction, in which the ejecting-slide is provided with a lug projecting through and working in a slot in the main frame. Instead of the stem $d$, attached to this slide, I have shown a pin or rod, $d^5$, on which this lug works and on which is placed the recoil-spring. This is a preferable construction, as it simplifies the manufacture and gives a better and more positive action. I have also shown in Fig. 10 a slightly different form of key $f$, the stem $f'$ of which is perforated and the lever $g$ passed through it. This not only prevents the key from turning and presenting its label upside down, but also enables the key to be pulled up and bring the levers with it if under any circumstances it should stick and refuse to freely act.

Having thus fully described my invention, what I claim as new, and desire to secure by Letters Patent, is—

1. In a money-changer, the combination, with the lower case containing the operating mechanism, of the upper case provided with a series of tubes or coin-holders, $b$, having their sides slotted at their lower ends, ejector-slides $c$, pushers $c^2$, pivoted to said slides, and the springs $c^3$ and $d'$, operating said slides and pushers, respectively, all arranged and operated as set forth.

2. In a money-changer, the combination, with the upper and the lower case, $a$, the former having the hinged cover $a'$ and glass front $a^2$, of a series of coin-holders or tubes, $b$, having their sides slotted at their lower ends, doors $b'$, provided with graduations $b^2$, and a series of pointers for indicating the number of coins placed within the holders $b$, the slides $c$, the springs $d'$, operating said slides, the pushers $c^2$, their springs $c^3$, and the operating mechanism, constructed and arranged as herein shown and described, and for the purpose set forth.

In testimony whereof I affix my signature in presence of two witnesses.

WILLIAM H. STAATS.

Witnesses:
 W. C. McArthur,
 W. S. McArthur.